United States Patent [19]

Hinton et al.

[11] 3,993,089
[45] Nov. 23, 1976

[54] FLOW CONTROLLER DEVICE

[75] Inventors: Melvin F. Hinton; Davies Allport, both of La Jolla, Calif.

[73] Assignee: Reed Irrigation Systems, El Cajon, Calif.

[22] Filed: Oct. 17, 1975

[21] Appl. No.: 623,396

[52] U.S. Cl. ............................. 137/116.3; 251/209
[51] Int. Cl.² ..................... F16K 45/00; F16K 5/12
[58] Field of Search............ 137/115, 116.3, 505.11; 251/208, 209, 309

[56] References Cited
UNITED STATES PATENTS

| | | | |
|---|---|---|---|
| 2,793,075 | 5/1957 | Gulick, Jr. .................. | 137/505.11 X |
| 3,341,168 | 9/1967 | Toeppen ......................... | 251/208 X |
| 3,520,320 | 7/1970 | Crawford et al..................... | 137/115 |

*Primary Examiner*—William R. Cline
*Attorney, Agent, or Firm*—Owen, Wickerham & Erickson

[57] ABSTRACT

A combination flow control, shutoff and pressure relief device comprises a body with a movable spool and inlet and outlet portions. The spool supports a spring loaded valve head that forms an internal fluid chamber around one end when the handle fixed to the other end is in the closed position. An orifice in the body inlet portion is progressively opened from a complete shutoff position by rotation of the spool within the body to provide flow into the fluid chamber. When fluid pressure within the internal chamber exceeds a preselected spring force on the valve head, the latter opens to provide pressure relief. Regulation of the fluid pressure in the chamber and thus in the outlet can be maintained at the preselected level by controlling the size of the inlet orifice at a point just below the actuation level of the valve spring.

7 Claims, 5 Drawing Figures

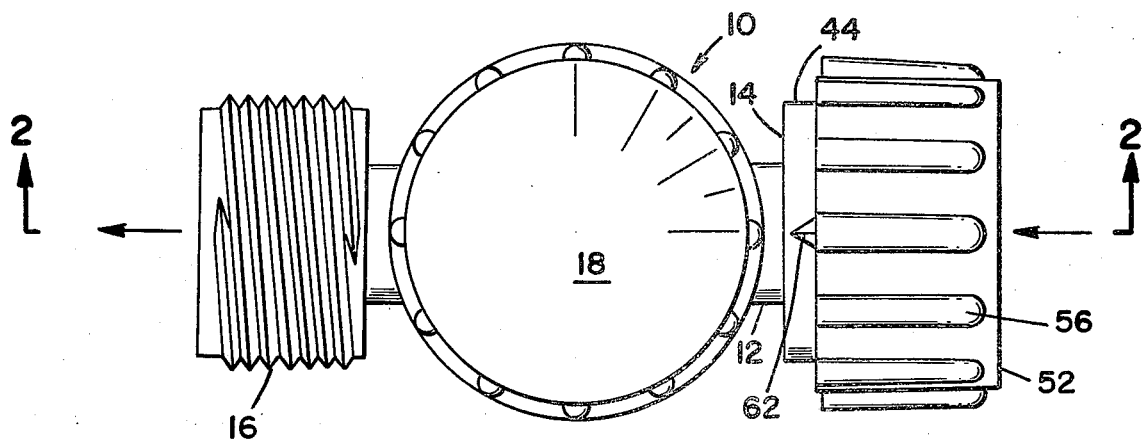
FIG_1
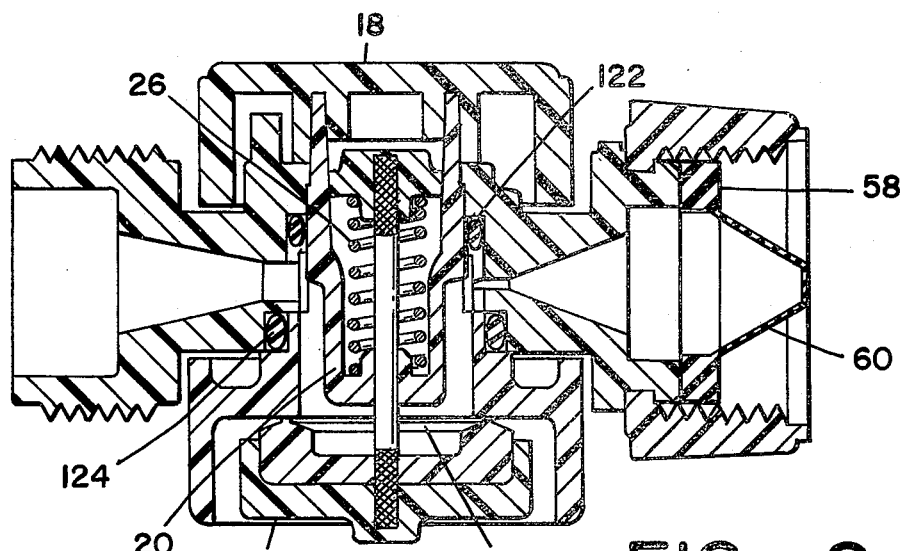
FIG_2
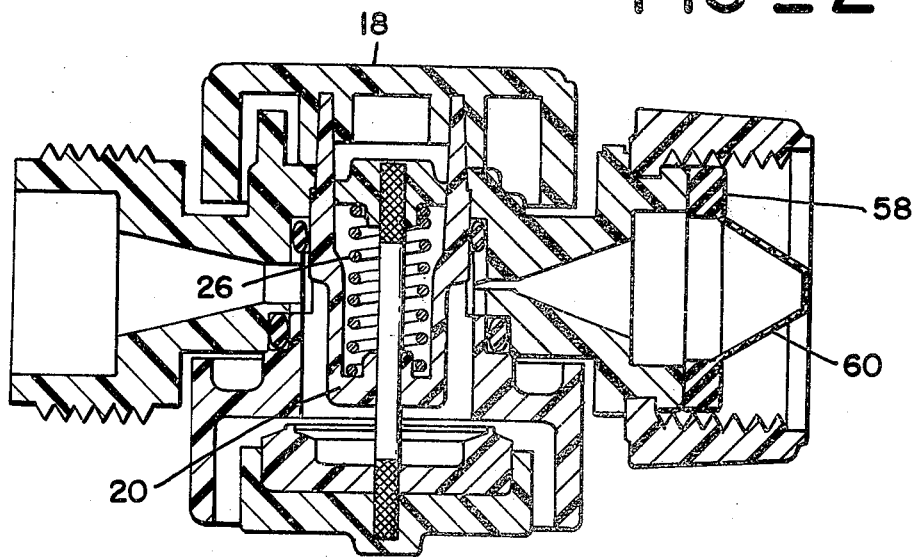
FIG_3

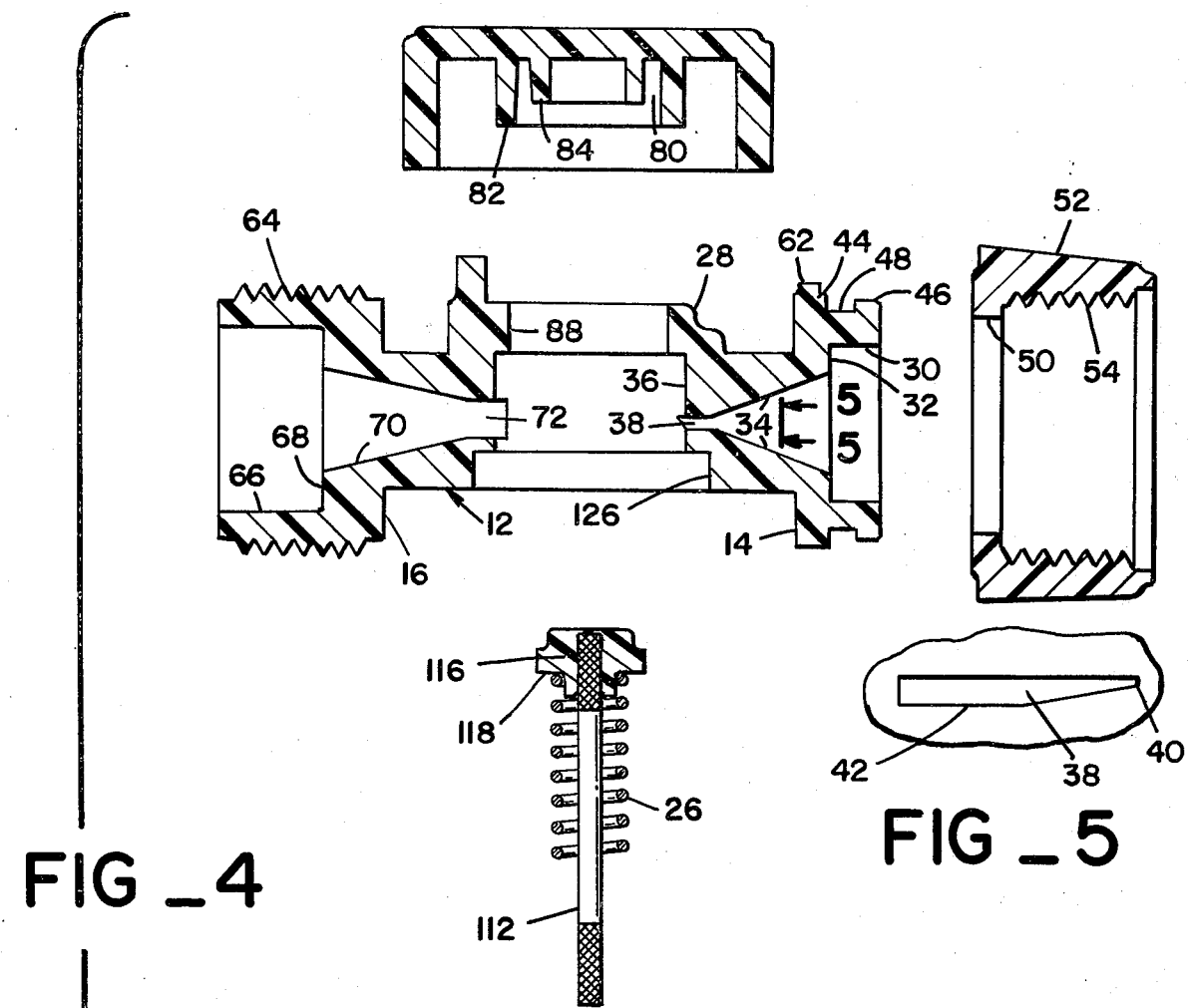
FIG_4
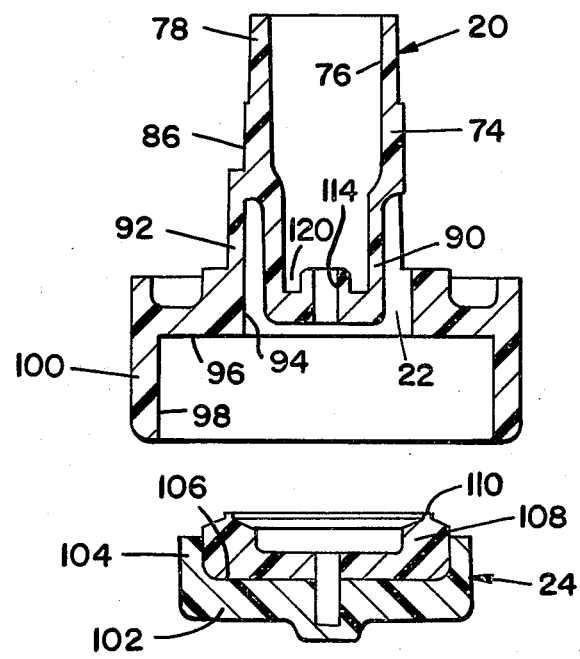
FIG_5

FLOW CONTROLLER DEVICE

BACKGROUND OF THE INVENTION

This invention relates to a combination flow control, shutoff and pressure relief valve and more particularly to such a valve that is well adapted for use in drip irrigation systems.

In various fluid distribution systems such as drip type irrigation systems it is necessary to control the flow rate and pressure of the fluid within fairly narrow limits in order to assure proper functioning of the system. For example, in many drip irrigation systems an optimum operating pressure level is around 15 psi, whereas the water normally supplied from existing waterworks systems may range from 40 to 80 psi. It was therefore necessary to provide a valve capable of reducing or regulating to a preselected level the pressure of water supplied to it so that drip emitters or other components in the attached system will operate properly. Moreover, it was necessary to provide a valve capable of providing substantially complete shutoff; of relieving any pressure surges originating at the supply source to prevent them from reaching the connected system; and also of preventing any over-pressurization in the system due to operator error, as could occur with a conventional adjustable regulator.

A general object of the present invention is to provide a combination valve that solves the aforesaid problems.

Another object of the present invention is to provide a control valve adapted for use with a drip irrigation system that will allow the pressure components in the system to be set at a preselected level despite the pressure of the water supply.

Another object of the present invention is to provide a small valve that will provide pressure controlling as well as full shut-off.

Yet another object of our invention is to provide a control valve capable of performing pressure control and full shutoff functions and which is particularly well adapted for ease and economy of manufacture.

BRIEF SUMMARY OF THE INVENTION

The aforesaid objects are accomplished by a combination shutoff, flow control and pressure relief valve that comprises a body with a movable spool and inlet and outlet portions. The spool supports a spring loaded valve head that forms a closure for an internal fluid chamber around one end of the spool when a handle fixed to its other end is in the closed position. Orifices in the body inlet and outlet portions are progressively opened from a complete shutoff position by rotation of the spool within the body to provide flow into the fluid chamber. When fluid pressure within the chamber exceeds a preselected spring force on the valve head, the latter opens to provide pressure relief. Regulation of the fluid pressure in the chamber and thus in the outlet can be maintained at the preselected set level by controlling the size of the inlet orifice at a point just below the actuation level of the valve spring. Other objects, advantages and features of the invention will become apparent from the following detailed description of one embodiment thereof presented in conjunction with the drawing.

BRIEF DESCRIPTION OF THE DRAWING

FIG. 1 is a top view of a controller device embodying principles of the present invention;

FIG. 2 is a view in elevation and in section taken along the line 2—2 of FIG. 1;

FIG. 3 is a view similar to FIG. 1 showing the device of FIG. 1 with its valve member in the open position;

FIG. 4 is an exploded view in elevation and in section showing the major components of the controller device according to the invention with the spool rotated 90° from its position in FIG. 1; and FIG. 5 is a greatly enlarged view in section taken at line 5—5 in FIG. 4 and showing the inlet orifice in the body member.

DETAILED DESCRIPTION OF PREFERRED EMBODIMENT

With reference to the drawing, FIG. 1 shows a flow controller device 10 embodying principles of the present invention. Generally, it comprises a central body 12 with an inlet 14 on one side adapted for connection to a conventional water supply outlet and an outlet 16 on its other side adapted for connection to a conduit wherein fluid pressure is desired to be controlled, as in a drip irrigation system. Located between the inlet and outlet is a rotatable control knob 18 connected to an internal spool 20 that is supported within the body. As shown in FIG. 2, the spool functions with the body to vary the flow rate of fluid into an internal chamber 22 that is formed around the spool and normally closed by a valve member 24. The latter, which is supported by the spool and biased by a spring 26 to its closed position, is actuated by an increase in fluid pressure above a preselected level to open the chamber and release fluid from it. Thus, by keeping the inlet flow of fluid just below the rate necessary to operate the valve member 24, the fluid flow and pressure at the outlet 16 (on the conduit connected thereto) is kept to a known level.

As best shown in FIG. 4, the valve body 12 is a one piece molded plastic member with a central, generally cylindrical portion 28 with the integral inlet and outlet portions 14 and 16 extending radially therefrom. The inlet portion has a cylindrical outer cavity 30 that forms an annular shoulder 32 around a tapered inlet passage 34 extending to the inside wall 36 of the central cylindrical body portion 28. This tapered passage terminates at a narrow opening 38 in the cylindrical wall of the central body portion and extends arcuately along the wall. As shown in FIG. 5, the inlet opening 38 tapers from a closed point 40 at one end and gradually widens to a maximum width near a mid point 42 of its length. From this mid point to the other end it maintains a substantially constant width. As will be seen, the tapered portion of the inlet opening affords a smaller variation in flow rate per degree of knob rotation as it is initially opened.

The outside of the inlet portion 14 has an inner, circular flange 44 and an outer flange 46 of smaller diameter with a beveled edge and between these flanges is an external, peripheral groove 48. The latter is sized to receive a radially inwardly extending lip flange 50 of a rotatable female coupling ring 52. The latter has internal threads 54 adapted to connect to a standard hose bib and outer axially extending and circumferentially spaced apart protrusions 56 to provide a better gripping surface. Seated within the coupling ring 52 is an annular elastomeric gasket 58 with a conical screen 60 attached to it and projecting axially.

A diamond shaped protrusion 62 is provided on the exterior surface of the inner flange 44 which provides a fixed reference point for the adjustable control knob 18 on the device when it is rotated to various operating positions.

The outlet portion 16 of the body 12 is generally cylindrical and has external standard made threads 64 which enable it to be connected with a standard female hose coupling. An inner cylindrical cavity 66 in this outlet portion forms a shoulder 68 around a tapered passage 70 that diverges inwardly to an outlet opening 72 in the wall 36 of the central body member 28. This outlet opening is essentially rectangular but much larger in area and longer than the inlet opening 38.

In the embodiment shown, the spool 20, which is also preferably molded as a one piece element, as illustrated in FIG. 4, has a central tubular section 74 forming a cavity 76 for the valve spring 26. The upper end 78 of the latter tubular portion has an outside diameter which enables it to fit within an annular groove 80 formed in the inside of the control knob 18 by a pair of concentric integral ridges 82 and 84. Spaced downwardly from the upper end portion of the spool is an intermediate portion 86 with a smooth cylindrical surface of somewhat larger diameter that provides a snug sliding fit with an internal cylindrical wall 88 of the body 12. Extending downwardly from the intermediate spool portion 86 is a lower end portion 90 of its central tubular section having an even smaller diameter than its upper end portion. The central tubular section is integrally connected to an enlarged spool section 92 which extends from its lower end portion and has a generally circular shape. This enlarged section has an inner cylindrical wall 94 having a diameter greater than both the lower end and intermediate portions of the central tubular section, thereby forming the chamber 22 around the lower end portion 90. The wall 94 terminates at an annular shoulder 96 within the enlarged spool section which is formed by a cylindrical recess 98, the latter being formed by an annular wall member 100. The recess contains the valve member 24 which operates to open and close the chamber 22 in accordance with the fluid pressure that exists therein. The valve member 24 is essentially a circular poppet cap 102 preferably of molded plastic material and having a cup shape with an annular sidewall 104 forming a seat 106 for an elastomeric valve closure 108. The latter has a circular bead portion 110 that is adapted to form a sealing engagement with the shoulder 96 when the valve member 24 is closed.

Fixed to the center of the poppet cap 102 is a metal connector pin 112 which extends axially upward through the elastomeric closure 108, through an opening 114 in the lower end portion 90 of the inner spool and through the valve spring 26. The upper end of the pin 112 is fixed to a circular spring retainer 116 whose diameter is only slightly less than the inside diameter of the spool cavity 76 at its upper end. An upper end of the valve spring bears against an inside surface 118 of the retainer and its lower end is retained by an annular groove 120 at the lower end of the tubular spool section 74. Upward travel of the retainer is limited by its proximity to the inner annular ridge member 84 on the control knob 18. The length of the spring 26 is such that the valve closure 24 is normally forced into sealing engagement with the surface of the shoulder 96 thereby closing the chamber 22 except for the inlet opening 38 and outlet opening 72. The force of the spring is predetermined by its design size so that the valve closure 24 will maintain its seal until the pressure within the chamber reaches a desired level.

The assembly of the controller 10 may be accomplished easily with a minimum of labor because of the unique configuration and arrangement of the component parts. The valve spring 26 is first placed within the inner spool cavity 76. The valve pin 112 with the retainer 116 already attached is then inserted downwardly through the spring and the opening 114 in the spool end portion 90. The lower end of the pin 112 is then forced into the poppet cap 102 within which the elastomeric closure member 108 has been seated. Now, the spool assembly is inserted into the bore 88 of the body portion 28 with an O-ring seal 122 provided about the inlet and outlet openings between the body inner wall 36 and the outer surface of the spool portion 86. A similar O-ring seal 124 is provided below the inlet and outlet openings between an inner surface of a recess 126 in the body 28 and an outer surface of the lower portion 92 of the spool. The control knob may now be attached by a press fit to the upper open end 78 of the inner spool member 74. The spool is thus rotatable within the body and the device is ready for connection and use.

In operation, the controller 10 is attached by its inlet coupler 52 to a standard hose bib with its outlet portion 16 connected to some other conduit such as a drip irrigation line having a series of drip emitters that operate most efficiently at some relatively low pressure, e.g. 15 psi. The control knob 18 is turned initially so that a relatively large flow is allowed to pass through the inlet opening 38 into the chamber 22. With the relatively large flow, the chamber pressure will exceed the closing force of the spring 26 and the valve member 24 will thus move away from its sealing position, allowing water to flow from the chamber. The annular wall 100 on the lower end of the valve member 24 stops any stream of water from escaping around the valve closure, thereby making it easy to handle and adjust without getting wet. At this point, the control knob 18 is turned to decrease the size of the inlet opening 38 until the fluid pressure within the chamber 22 does not exceed the spring force. Thus, the valve closure 108 will be allowed to seat against the shoulder 96 and shut off the escape of fluid from around it. At this point the pressure within the chamber 22 is approximately at its preselected level commensurate with the spring force, and all water through the outlet opening is also at this pressure. If shut-off is desired, this may be accomplished merely by turning the control knob 18 until the inlet opening 38 is completely blocked by the spool.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A controller device for fluid systems comprising:
   a body member with a central bore and having an inlet portion adapted for connection with a fluid supply, said inlet portion including an inlet opening to said bore, and an outlet portion with an outlet opening from said bore and adapted for connection with a drip irrigation conduit having emitter means that are operable at a pressure level less than said fluid supply;

a rotatable spool member extending within said central bore of said body member, having handle means fixed to one end thereof and having a variable portion positioned for registry with said inlet opening to cover and close the opening to an increasing extent as the handle means is rotated in one direction, said bore and spool member forming an internal fluid chamber communicating with said outlet and normally with said inlet, said chamber having an opening at one end;

a movable valve means attached to the other end of said spool member and having means forming a closure for said chamber opening, said movable valve means including bias means urging its closure means to a preselected degree toward a closed position over the chamber opening, so that at a preselected pressure level within said internal chamber the valve means moves to an open position to allow the escape of fluid from said chamber; whereby said handle means can be turned to decrease the flow through said inlet opening and thus the pressure within said chamber until said valve closure means remains closed so that fluid is supplied through said outlet opening to said emitter means at substantially the preselected pressure level.

2. The device as described in claim 1 wherein said body member is a one piece unit with said inlet and outlet portions extending radially from said central bore.

3. The device as described in claim 2 wherein said inlet opening is a narrow arcuate slot located in the sidewall of said central bore and tapered at one end.

4. The device as described in claim 1 wherein said rotatable spool member is a one piece unit including an inner tubular portion within said body and an integral lower portion forming a portion of said internal fluid chamber and forming a seat at said chamber opening for said valve closure means.

5. The device as described in claim 4 wherein said valve means includes a coil spring within said inner tubular spool portion, serving as said bias means, a connecting pin extending axially through said spring and one end of said tubular spool portion, and retainer means fixed to one end of said pin within said inner tubular spool portion, said pin being connected at its other end to said valve closure means below said inner tubular spool portion.

6. The device as described in claim 5 wherein said valve closure means includes a rigid circular member forming a seat for an elastomeric member having an annular sealing bead which engages and seals against the seat of said lower spool portion to cover said chamber opening when the valve means is in its closed position.

7. The device as described in claim 5 wherein said lower spool portion has an outer wall portion spaced radially outwardly from said valve closure means to deflect any fluid escaping from said chamber.

* * * * *